United States Patent [19]

Miller et al.

[11] Patent Number: 4,786,515

[45] Date of Patent: Nov. 22, 1988

[54] PROCESS FOR THE TENDERIZATION OF MEAT CUTS

[75] Inventors: Ronald Miller, London; David I. Gray, Royston, both of England

[73] Assignee: Empire Polymers Limited, London, England

[21] Appl. No.: 942,050

[22] Filed: Dec. 16, 1986

Related U.S. Application Data

[63] Continuation of Ser. No. 709,318, filed as PCT GB84/00216 on Jun. 21, 1984, published as WO85/00091 on Jan. 17, 1985.

[30] Foreign Application Priority Data

Jun. 22, 1983 [GB] United Kingdom ................. 9316903

[51] Int. Cl.$^4$ .............................................. A23L 1/318
[52] U.S. Cl. .................................... 426/281; 426/641; 426/652
[58] Field of Search ............... 426/281, 641, 264, 265, 426/266, 646, 652

[56] References Cited

U.S. PATENT DOCUMENTS

| | | | |
|---|---|---|---|
| 3,147,122 | 9/1964 | Williams | 426/281 X |
| 3,207,608 | 9/1965 | Brown et al. | 426/281 |
| 3,266,909 | 8/1966 | Ellis | 426/641 X |
| 4,478,859 | 10/1984 | Fox | 426/266 |

FOREIGN PATENT DOCUMENTS

| | | | |
|---|---|---|---|
| 104844 | 8/1980 | Japan | 426/646 |
| 39147 | 8/1982 | Japan | . |

*Primary Examiner*—Arthur L. Corbin
*Attorney, Agent, or Firm*—St. Onge Steward Johnston & Reens

[57] ABSTRACT

Xanthan gum is used for tenderizing meat cuts, preferably in combination with a curing treatment, in which the meat cut is injected or otherwise treated with an aqueous brine solution to which the Xanthan gum has been added.

3 Claims, No Drawings

PROCESS FOR THE TENDERIZATION OF MEAT CUTS

This is a continuation of co-pending application Ser. No. 709,318 filed on as PCTGB84/00216 on Jun. 21, 1984, published as WO85/00091 on Jan. 17 1985, now abandoned.

BACKGROUND OF THE INVENTION

1. Field of the Invention

This invention relates to a process for the tenderisation of meat cuts, which latter term is used herein to refer to dressed meat (including poultry, but excluding fish and whalemeat) in piece form ranging in size from individual cuts or slices up to whole sides of whole carcasses, including whole poultry carcasses, e.g. chicken, turkey, duck, etc., but not including comminuted meat, e.g. mince or sausage meat. Most particularly the invention is concerned with the tenderisation of meat cuts such as ham, bacon joints, pork shoulders, tongues, and beef cuts such as silverside and brisket.

2. Description of the Prior Art

In the curing of such meat cuts the dressed meat is usually injected with a brine solution, usually by multi-needle injection or by stitch or artery pumping, followed in sequence by resting, tumbling and/or massaging and finally cooking. Alternatively the meat cuts can simply be tumbled or massaged in the brine solution. Typical pickling procedures are disclosed in U.S. Pat. Nos. 3,565,539, 3,683,789, 3,922,357.

Typically the brines used in such pickling processes will comprise one or more inorganic salts, particularly chlorides (sodium chloride), phosphates, nitrates or nitrites, organic compounds such as suger, amino acids, protein extracts, and/or flavouring agent and tenderising agents.

As tenderising agents it is known to use proteolytic enzymes, and in GB-A-1 355 175 proteolytic enzymes are used in combination with a tragacanth as a thickening agent and which allegedly assists and improves the distribution of the enzyme throughout the meat. Other natural gums such as gum arabic, agar, guar gum, gum karaya and locust bean gum are specifically disparaged as either not providing the necessary setting properties or providing too viscous a solution to be injected by normal injection means.

In JP-A-39147/82 abstracted in Food Technology, Vol. 37, No.1, January 1983, xanthan gum is disclosed as a thickening agent for addition to pickling solutions used in the preservation in the raw state of foodstuffs, primarily foodstuffs of vegetable origin, but also mentioning pickled products such as whalemeat, cuttle fish, salmon and sea cucumbers. In JP-A-39147/82, xanthan gum is added to the pickling solutions in an amount of from 1% or less, usually 0.001 to 0.5% based on the total amount of raw pickling material, with the object of thickening the pickling solution to aid penetration and retention of the pickling medium by the pickled product. The thickening effect of xanthan gum in pickling solution is specifically contrasted with other gums such as guar gum, locust bean gum and carrageenan which are alleged to be ineffective in such pickling solutions.

The use of xanthan gum as a thickening agent in aqueous media is also to be found in FR-A-2318926 and FR-A-1502 883.

SUMMARY OF THE INVENTION

In accordance with the present invention it has been found that the injection of xanthan gum, either on its own or with conventional curing agents into meat cuts, has a significant tendering effect on the final product. Thus in a broad aspect the present invention relates to a process for the tenderisation of meat cuts by treatment with xanthan gum either by multi-needle injection with an aqueous xanthan gum solution, by stitch or artery pumping, by massaging or tumbling in an aqueous xanthan gum solution or in any other way effective to disperse the gum preferably uniformly throughout the tissue.

More specifically, the invention provides a process for the tenderisation of meat cuts which comprises treating the meat cut with an aqueous solution comprising as an essential ingredient therein a xanthan gum under conditions effective to disperse the xanthan gum into the meat cut. More specifically still the present invention provides a process for the tenderisation and cure of meat cuts which comprises treating the meat cut with an aqueous brine solution, preferably by multi-needle injection or artery or stitch pumping, or by massaging or tumbling in the brine solution, or by a combination of such steps, the process being characterised in that the aqueous brine solution used in the process contains as the characteristic ingredient a xanthan gum.

In addition to tenderisation, the inclusion of xanthan gum in the aqueous brine used in the curing of meat cuts in accordance with this invention, gives as additional benefits in particular a substantially higher cooking yield in the cured product, i.e. a lower weight loss during cooking, and improved colour and texture.

The amount of xanthan gum employed in the process of the invention is governed by two factors, the minimum effective amount and the viscosity of the treatment solution containing the xanthan gum. Below about 0.03% by weight of Xanthan gum based on the weight of the solution, the beneficial effects referred to hereinbefore are scarcely discernible. Above about 0.5% the viscosity of the solution becomes too great and the process becomes impractical. For most practical purposes, the preferred range will be from 0.05 to 0.3% xanthan gum based on the weight of the treatment solution. In terms of the cured product, the xanthan gum will be sufficient to provide xanthan concentrations in the cured meat of from 150–500 ppm, preferably 200–300 ppm.

In all other respects the process of the invention is entirely conventional and need not be described in detail. The xanthan gum may be added directly to the treatment solution as a dry powder or flake form and dissolved therein, possibly with gentle heating. Alternatively the gum may be pre-dissolved in water and added to the treatment solution as an aqueous concentrate. The treatment process itself may be carried out at ambient temperature, or slightly chilled—the latter being preferred, and at atmospheric pressure. Super-atmospheric pressures ov vacuum processes may also be employed.

The xanthan gum may be used in combination with other gums and in combination with other additives commonly used in meat curing or tenderising processes and particularly amino acid, and protein or protein extracts, for example as disclosed in U.K. Pat. Nos. 1,089,084 and 1,141,811 or published in U.K. application No. 2,059,247A.

Xanthan gum as used in the present invention is a known and commercially available polysaccharide produced by selected microorganisms of the genus Xanthomonas and as described for example in U.S. Pat. No. 3,328,262 and U.K. Pat. No. 1,512,536.

DESCRIPTION OF THE PREFERRED EMBODIMENTS

The process of the present invention is illustrated by the following Examples.

EXAMPLE 1

Curing of Fresh Pork Legs

A curing brine was made up by dissolving sodium nitrate, sodium polyphosphate, salt, sugar and 0.3% Xanthan Gum using a mechanical stirring device to aid dispersion. The curing solution was then injected into fresh pork legs to a level of 15% of the leg weight using a multineedle injection machine. The legs were then placed directly into a tank with a cover brine consisting of a salt and sodium nitrate solution and left for a period of 3 days.

The legs were then removed from the tanks and allowed to drain for a period of 12 hours before preparing for cooking. After cooking the cured legs, it was found that the texture was more tender, the legs gave a higher cooked weight with consistent colour throughout the meat, as compared to legs cured using the same brine solution without Xanthan Gum.

EXAMPLE 2

The Tenderising of Beef Silversides 0.3% Xanthan Gum was dispersed in a 2% salt solution using a mechanical stirring device.

The solution was then injected into beef silversides using a multineedle injection machine to 10% of the raw meat weight.

The silversides were then allowed to drain for 1 hour before vacuum packing. The vacuum packed meat was then held for 1 week in chill temperatures before cooking.

The resulting cooked silverside was more tender than ones prepared without Xanthan Gum and gave a higher cooked weight.

EXAMPLE 3

Initial tests on a laboratory scale were performed using small pieces of pork injected to 120% by a syringe with a brine solution containing 0.3% Xanthan Gum. The meat pieces were then mixed slowly by hand for 5 minutes and forced into a fibrous casing. The casing was then clipped tight and the product cooked in an oven to an internal temperature of 70° C.

The resulting product was then compared to a standard product made under the same conditions without Xanthan Gum.

RESULTS

The test product had the following advantages:
1. More Tender
2. Better Yield
3. Better Colour
4. Better Flavour
5. Less shrinkage

EXAMPLE 4

Ten legs of pork were boned out and prepared for ham production. They were then injected with a standard brine containing 0.3% Xanthan Gum and allowed to stand for 24 hours before being forced into casings. The injection level was 20% of the meat weight.

The casings were then clipped and the hams cooked until the centre temperature was 70° C. Ten standard hams were made at the same time and compared.

RESULTS

The test products were found to have the following benefits:
1. Yield Increase
2. More Tender
3. Better even colour
4. Better Flavour
5. Less Shrinkage

EXAMPLE 5

Tests were carried out on the incorporation of 0.2% Xanthan Gum into the injection brine used for the production of cured gammons and sides (Danish and English origin).

Injection was done at a variety of levels. Main production was based upon a 20% level.

RESULTS

Yields of green bacon were significantly increased. Subsequent cooking of gammons processed by this method were significantly more tender, with good colour, improved flavour/eating qualities. Yield of cooked ham was also increased with less shrinkage.

Sides were sliced and the resulting bacon had all the benefits previously noted.

Fresh chickens were also injected with a salt/Xanthan mixture. On reweighing after draining the birds were found to have lost very little of the injected weight. The cooked birds were very tender with good flavour/eating qualities.

EXAMPLE 6

Beef Topside & Silverside were injected with a salt/Xanthan mixture (0.3%) to a level of 20%. The finished meat was then vacuum packed and kept in chill conditions. Thick Flank was also tested under the same conditions.

RESULTS

Very little of the injected fluid was seen in the vacuum pack. The cooked meat was much more tender than the standard product. The tests also had a better flavour and less shrinkage.

EXAMPLE 7

Ten fresh hens were injected with a solution containing salt/Xanthan Gum (0.1%) mixture. They were then cooked and compared to ten hens treated as for standard production. Cooking was done in water for approximately one hour. The hens were then reweighed and broken down by production personnel into recoverable meat, bone and waste including fat. Then meat was weighed and comparisons made.

RESULTS

The weight of cooked hens was more than per standard, giving a higher level of recovered meat (approx 4%). On tasting the samples it was found that the test chicken had a more tender texture with better flavour.

For the avoidance of doubt it should be made clear that the process of this invention may be applied to both "bone-in" meat and boned meat, other than comminuted meat, although not excluding the possibility that the meat, after treatment in accordance with the invention, may then be minced or otherwise reduced to comminuted form.

We claim:

1. A process for the preparation of tenderized cooked dressed livestock or poultry meat cuts, said meat cuts ranging in size from an individual slice to a whole carcass, but not including minced or comminuted meat, which comprises the steps of:

injecting into the meat cuts, prior to cooking, an aqueous brine solution containing 0.05 to 0.3 percent by weight of xanthan gum; and thereafter cooking said meat cuts.

2. A process for the preparation of tenderised cooked dressed livestock or poultry meat cuts, said meat cuts ranging in size from an individual slice to a whole carcass, but not including minced or comminuted meat, which comprises the steps of:

massaging or tumbling said meat cuts, prior to cooking, in an aqueous brine solution containing 0.05 to 0.3 percent by weight of xanthan gum; and thereafter cooking said meat cuts.

3. A process according to claim 1 or 2 wherein the concentration of Xanthan gum introduced into the meat cut is within the range of 150 to 500 ppm.

* * * * *